Sept. 14, 1954      W. C. KNAPP      2,689,037
SHAKER CONVEYER CLAMP
Filed March 13, 1952
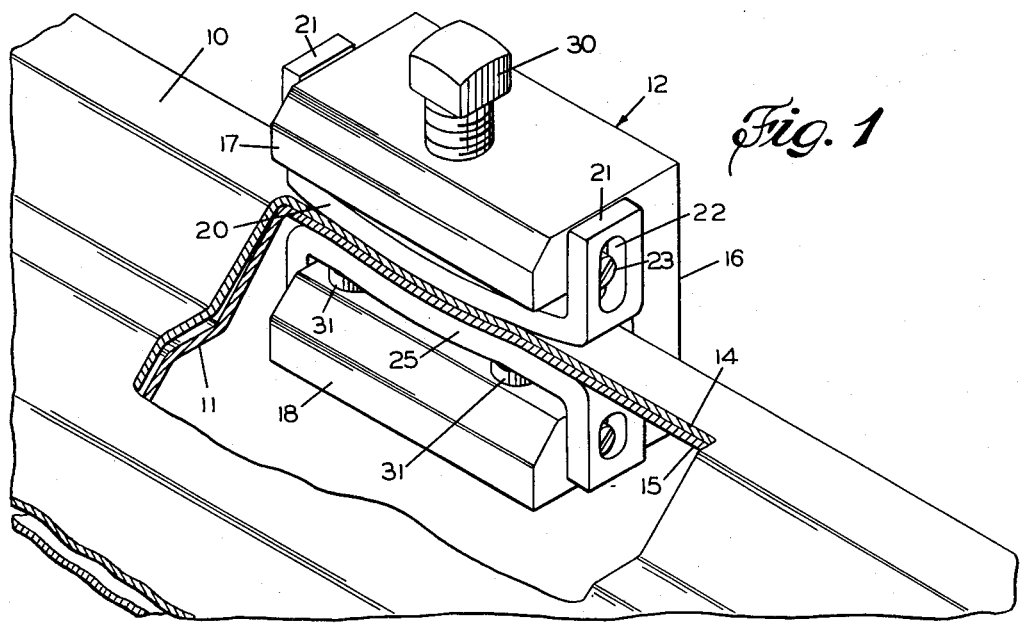
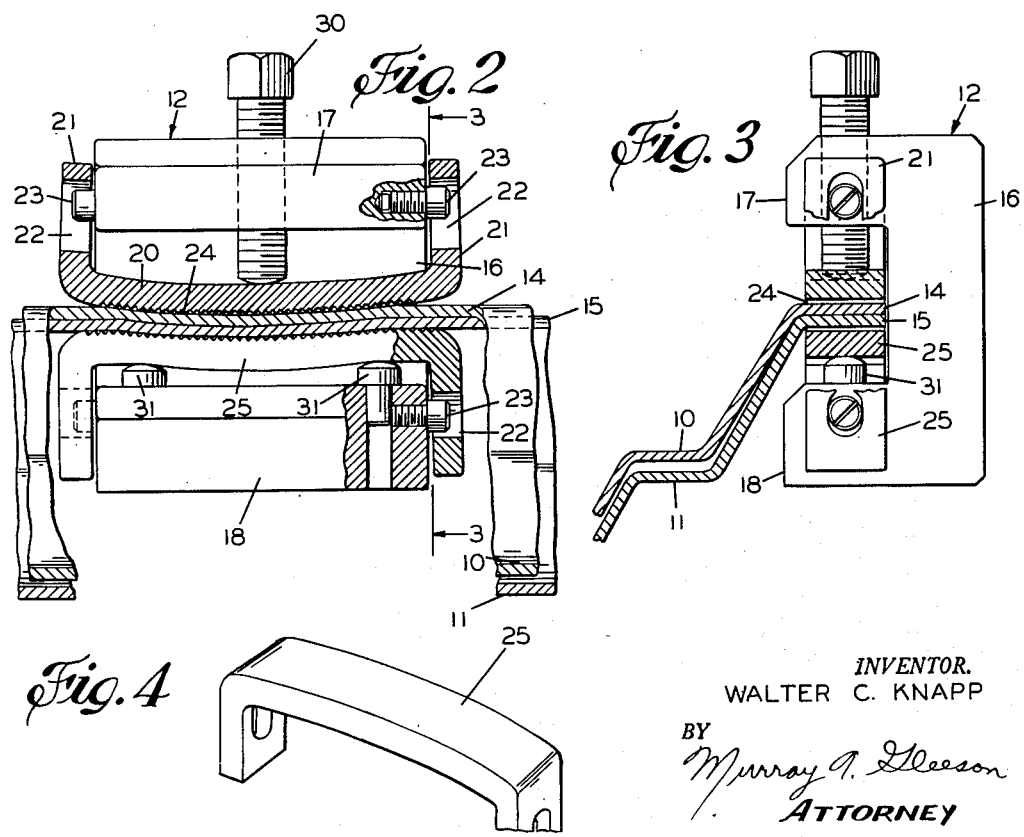
INVENTOR.
WALTER C. KNAPP
BY Murray J. Gleeson
ATTORNEY Patented Sept. 14, 1954

2,689,037

UNITED STATES PATENT OFFICE 2,689,037

SHAKER CONVEYER CLAMP

Walter C. Knapp, Chicago, Ill., assignor to Goodman Manufacturing Company, Chicago, Ill., a corporation of Illinois Application March 13, 1952, Serial No. 276,420

3 Claims. (Cl. 198—220)

This invention relates to improvements in clamping devices especially adapted for clamping telescopic trough sections of a shaker conveyor together, although not limited to such use.

Shaker conveyors having extensible pick-up shovels on their receiving ends are commonly provided with two telescopic trough sections in the trough line, so as to permit extension of the pick-up shovel for the length permitted by the telescopic trough sections, instead of inserting an additional trough section in the line. These telescopic trough sections are usually held together by gripping devices, as for instance C-clamps of various forms. However, the C-clamps heretofore used have not proved satisfactory in that, when they are sufficiently tightened to positively hold the telescopic troughs against relative movement during the shaking movement of the trough line, the gripping surfaces or edges of the trough sections are often permanently deformed or marred to the extent that the strength of the troughs is impaired, and the trough sections do not slide quickly and easily with respect to each other in making the desired telescopic adjustments of the trough line. This shortcoming of conventional C-clamps has become particularly troublesome since the introduction of relatively thin-walled troughing, and also relatively light metal troughing, such as aluminum.

The principal object of the present invention is to provide an improved and efficient form of clamping device for telescopic troughs and the like, so designed as to secure the troughs together under such a limited bending stress distributed over a wide area as to avoid permanent deformation or marring of the trough edges.

Other objects and advantages of the invention will appear as the following description proceeds.

The invention may best be understood by reference to the accompanying drawing, in which:

Figure 1 is a perspective view showing my improved clamping device mounted in gripping relation on the edge of a conveyor trough line, to hold two telescopic trough sections together, and with parts of the trough line broken away;

Figure 2 is a longitudinal view, in part section, of the device shown in Figure 1;

Figure 3 is a detail section taken on line 3—3 of Figure 2;

Figure 4 is a fragmentary detail section showing a modified form of clamping shoe, without serrations on its clamping surface.

In the embodiment of the invention illustrated in the drawing, a portion of a telescopic trough section 10 is nested in a trough section 11, and my novel C-clamp 12 is shown as engaging the edges of said trough sections at one side thereof, it being understood that two or more similar clamps are used to connect said trough sections together, with at least one clamp being on each side thereof. Said trough sections are of a well-known form used in shaker conveyors, as herein shown having outwardly flanged upper edges 14 and 15, respectively, extending along opposite sides thereof.

The clamping device 12 has a relatively heavy rigid frame 16 substantially C-shaped in vertical section, but said frame being elongated in the direction of the troughs to be connected together. The frame has inwardly extending upper and lower jaws 17 and 18 spaced apart in parallel relation.

An elongated generally U-shaped clamping shoe 20, consisting of a strip of metal, is mounted along the under face of the upper jaw 17, with its relatively short upturned ends 21, 21 loosely connected to opposite ends of said upper jaw to permit limited vertical movement between said shoe and jaw. In the form shown herein, the upturned ends 21, 21 have vertically elongated slots 22, 22 into which studs 23, 23, screwed into opposite ends of the upper jaw, extend.

The under face of the shoe 20 may have a roughened friction surface, as for instance by means of shallow serrations 24 extending transversely thereof, to aid in gripping the adjacent surface of the trough, if necessary, to provide sufficient frictional engagement therewith when the conveyor is subject to especially heavy impact loads, although in many instances such serrations will be found unnecessary and can be dispensed with, as shown in Figure 4.

The bottom jaw 18 has a gripping shoe 25 similar to the upper shoe 20, but in inverted or opposed relation to, and spaced from, the latter.

Means are provided on the jaws 17 and 18 for imposing clamping pressure on the clamping shoes at spaced alternate points so as to exert a bending stress on the two clamping shoes on opposite sides of the trough edges therebetween. In the form shown herein, a single adjusting screw 30 is threaded through the upper jaw 17 and engages the upper clamping shoe 20 at its center. A pair of studs 31, 31 are mounted on the upper face of the lower jaw 18, to support the lower clamping shoe 25 near opposite ends thereof.

The use and operation of the clamping device is as follows:

In the preferred form shown, the clamping shoes 17 and 18 are normally curved on complementary, convex and concave arcs, so that their opposed clamping surfaces are bowed on a relatively long radius from end to end.

The clamp is applied to the edges of two telescopic troughs 10 and 11, as shown in Figures 1, 2 and 3, where it will be seen that the adjusting screw 30 is screwed down against the center of the upper shoe 20. The lower shoe is supported at opposite ends on the studs 31, 31 so as to bend the trough edges on the same relatively long arc as the opposed surfaces of the shoes, as shown in Figures 1 and 2.

The shoes 20 and 25 are considerably thicker and resistant to deformation than the trough edges, so that longitudinal bending or distortion of the trough edges will, under moderate pressures, be limited to the initial or normal arc of the shoes. It will be observed, however, that the clamping frame and its jaws 17, 18 are considerably more massive and resistant to deformation than the shoes 20 and 25. Accordingly, as clamping pressure is increased on the shoes by the adjusting screw 30, said shoes, together with the intervening trough edges, may be further bent downwardly to a slight degree, limited however by the combined resistance of the two clamping shoes against further bending deflection.

As a result of the arrangement of the cooperating clamping shoes and the means for exerting an alternate 3-point clamping pressure thereon as above described, it will now be understood that the lapped trough edges can be securely held together under combined frictional and bending stresses, but that the degree of arcuate distortion of the trough edges will be limited at all times by the combined resistance of the two shoes. Thus, the permissible arcuate distortion of the trough edges can be maintained well within the yield points of said trough edges, so as to protect the latter from any permanent deformation or other objectionable marring of said edges, such as is likely to be produced with clamping devices of the kind previously employed for similar purposes.

With further reference to the necessity for employing roughened surfaces, such as the serrations on the opposed surfaces of the clamping shoes as previously referred to, tests have demonstrated that, when four such clamps are used without any roughened or serrated surfaces, they will withstand as much endwise impact load as the troughs themselves, but that, with suitable serrations, the two clamps can hold steel troughs of conventional design against substantially as much endwise compression as the troughs themselves can withstand. It will be understood, however, that the use of serrations may be dependent to some degree upon the physical properties of the troughs with which the clamps are used. For instance, serrations may not be desirable with troughs made of softer metals, such as aluminum.

It will be understood that certain variations from the initial arcuate shape of either or both of the clamping shoes 17 and 18 may be permissible. For instance, one or both opposed gripping surfaces of the shoes may be substantially straight when not under load, and subsequent application of the 3-point stress can be depended upon for producing the desired arcuate clamping position of the shoes and trough edges.

Although I have shown and described certain embodiments of my invention, it will be understood that I do not wish to be limited to the exact construction shown and described, but that various changes and modifications may be made without departing from the spirit and scope of the invention as defined in the appended claims.

I claim:

1. A clamping device for connecting lapped conveyor trough sections and the like, comprising a C-shaped frame with opposed rigid jaws elongated in the direction longitudinally of the trough sections to be connected, U-shaped clamping shoes, each loosely connected to one of said jaws to afford limited movement of said clamping shoes relative to their respective jaws, and toward and away from the other shoe, three abutments disposed alternately in spaced relation along the two jaws for engaging said clamping shoes, and means on one of said jaws for adjusting one of the abutments relative to the other abutments to exert a clamping and bending stress on said shoes.

2. A clamping device in accordance with claim 1, wherein the clamping shoes are normally capable of being bent longitudinally with substantially less deformation than the yield point of the edges of conventional conveyor trough sections.

3. A clamping device in accordance with claim 1, wherein the clamping shoes consist of strips of metal bent upwardly at their ends, and said upwardly bent ends have pin-and-slot connections to opposite ends of their respective jaws.

References Cited in the file of this patent

UNITED STATES PATENTS

| Number | Name | Date |
|--------|------|------|
| 300,140 | Schlumm | June 10, 1884 |
| 1,541,715 | Johnson | June 9, 1925 |
| 2,523,293 | Hagenbook | Sept. 26, 1950 |